United States Patent

Burstein et al.

(10) Patent No.: US 9,665,566 B2
(45) Date of Patent: May 30, 2017

(54) COMPUTER-IMPLEMENTED SYSTEMS AND METHODS FOR MEASURING DISCOURSE COHERENCE

(71) Applicant: Educational Testing Service, Princeton, NJ (US)

(72) Inventors: Jill Burstein, Princeton, NJ (US); Swapna Somasundaran, Plainsboro, NJ (US); Martin Chodorow, New York, NY (US)

(73) Assignee: Educational Testing Service, Princeton, NJ (US)

( * ) Notice: Subject to any disclaimer, the term of this patent is extended or adjusted under 35 U.S.C. 154(b) by 57 days.

(21) Appl. No.: 14/633,200

(22) Filed: Feb. 27, 2015

(65) Prior Publication Data

US 2015/0248397 A1    Sep. 3, 2015

Related U.S. Application Data

(60) Provisional application No. 61/945,866, filed on Feb. 28, 2014, provisional application No. 61/949,499, filed on Mar. 7, 2014.

(51) Int. Cl.
G06F 17/27    (2006.01)
G09B 5/00    (2006.01)

(52) U.S. Cl.
CPC .......... *G06F 17/279* (2013.01); *G09B 5/00* (2013.01)

(58) Field of Classification Search
CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775
USPC ................................................. 704/1, 9, 10
See application file for complete search history.

(56) References Cited

U.S. PATENT DOCUMENTS

| | | | |
|---|---|---|---|
| 6,353,824 B1 * | 3/2002 | Boguraev | G06F 17/214 704/9 |
| 6,907,562 B1 * | 6/2005 | Schuetze | G06F 17/22 707/E17.111 |
| 7,260,519 B2 * | 8/2007 | Polanyi | G10L 17/26 704/9 |
| 7,305,336 B2 * | 12/2007 | Polanyi | G06F 17/30719 704/1 |

(Continued)

OTHER PUBLICATIONS

Tur et al., The CALO meeting speech recognition and understanding system, 2008, SRI International, SLT, pp. 69-72.*

(Continued)

*Primary Examiner* — Lamont Spooner
(74) *Attorney, Agent, or Firm* — Jones Day

(57) ABSTRACT

Systems and methods are provided for automatically generating a coherence score for a text using a scoring model. A lexical chain is identified within a text to be scored, where the lexical chain comprises a set of words spaced within the text. A discourse element is identified within the text, where the discourse element comprises a word within the text. A coherence metric is determined based on a relationship between the lexical chain and the discourse element. A coherence score is generated using a scoring model by providing the coherence metric to the scoring model.

25 Claims, 9 Drawing Sheets

(56) References Cited

U.S. PATENT DOCUMENTS

| | | | | |
|---|---|---|---|---|
| 7,363,213 | B2* | 4/2008 | Polanyi | G06F 17/274 704/8 |
| 7,369,985 | B2* | 5/2008 | Polanyi | G06F 17/274 704/8 |
| 7,424,420 | B2* | 9/2008 | Polanyi | G06F 17/274 704/8 |
| 8,041,126 | B1* | 10/2011 | Naik | G06F 17/2785 382/180 |
| 2004/0029085 | A1* | 2/2004 | Hu | G06F 17/2745 434/178 |
| 2004/0117725 | A1* | 6/2004 | Chen | G06F 17/30719 715/254 |
| 2004/0122657 | A1* | 6/2004 | Brants | G06F 17/2229 704/9 |
| 2005/0108001 | A1* | 5/2005 | Aarskog | G06F 17/271 704/10 |
| 2007/0185831 | A1* | 8/2007 | Churcher | G06F 17/2785 |
| 2008/0201133 | A1* | 8/2008 | Cave | G10L 15/1815 704/10 |
| 2008/0221892 | A1* | 9/2008 | Nathan | G06F 17/279 704/257 |
| 2009/0083027 | A1* | 3/2009 | Hollingsworth | G06F 17/277 704/9 |
| 2009/0083677 | A1* | 3/2009 | Darwish | G06F 17/30014 715/854 |
| 2011/0196670 | A1* | 8/2011 | Dang | G06F 17/2785 704/9 |
| 2013/0021346 | A1* | 1/2013 | Terman | G09B 5/08 345/467 |
| 2014/0040275 | A1* | 2/2014 | Dang | G06F 17/2785 707/741 |
| 2014/0372102 | A1* | 12/2014 | Hagege | G06F 17/278 704/9 |

OTHER PUBLICATIONS

Lin, Discourse parsing: Inferring discourse structure, modeling coherence, and its applications, 2011, National University of Singapore, pp. 1-176.*

McNamara et al., Coh Metrix: Automated cohesion and coherence scores to predict text readability and facilitate comprehension, 2002, Technical report, Institute for Intelligent Systems, University of Memphis, Memphis, TN, pp. 1-26.*

Fuentes et al., Using cohesive properties of text for automatic summarization, 2002, JOTRI'02, pp. 1-8.*

Barzilay et al., Using Lexical Chains for Text Summarization, 1999, Advances in automatic text summarization, pp. 111-121.*

Attali, Yigal, Burstein, Jill; Automated Essay Scoring With E-rater, v.2; Journal of Technology, Learning, and Assessment, 4(3); Feb. 2006.

Barzilay, Regina, Elhadad, Michael; Using Lexical Chains for Text Summarization; Proceedings of the ACL Workshop on Intelligent Scalable Text Summarization, 17; pp. 10-17; 1997.

Barzilay, Regina, Lapata, Mirella; Modeling Local Coherence: An Entity-Based Approach; Computational Linguistics, 34(1); pp. 1-34; 2008.

Barzilay, Regina, Lapata, Mirella; Modeling Local Coherence: An Entity-Based Approach; Proceedings of the 43rd Annual Meeting of the ACL; pp. 141-148; Jun. 2005.

Burstein, Jill, Kukich, Karen, Wolff, Susanne, Lu, Chi, Chodorow, Martin; Enriching Automated Essay Scoring Using Discourse Marking; Eric Clearinghouse; 1998.

Burstein, Jill, Tetreault, Joel, Andreyev, Slava; Using Entity-Based Features to Model Coherence in Student Essays; Proceedings of the Annual Conference of the North American Chapter of the ACL; pp. 681-684; Jun. 2010.

Burstein, Jill, Tetreault, Joel, Madnani, Nitin; The E-rater Automated Essay Scoring System; Ch. 4, Handbook of Automated Essay Scoring: Current Applications and Future Directions, M. Shermis & J. Burstein Eds.; Routledge: New York, NY; pp. 55-67; 2013.

Burstein, Jill, Tetreault, Joel, Chodorow, Martin; Holistic Annotation of Discourse Coherence Quality in Noisy Essay Writing; Dialogue and Discourse, 4(2); pp. 34-52; 2013.

Carthy, Joseph, Sherwood-Smith, Michael; Lexical Chains for Topic Tracking; IEEE Conference on Systems, Man and Cybernetics, 7; Oct. 2002.

Charniak, Eugene; A Maximum-Entropy-Inspired Parser; Proceedings of the 1st Annual Meeting of the North American Chapter of the Association for Computational Linguistics; pp. 132-139; 2000.

Cohen, Jacob; Weighted Kappa: Nominal Scale Agreement with Provision for Scaled Disagreement or Partial Credit; Psychological Bulletin, 70(4); pp. 213-220; Oct. 1968.

Coward, Ann; The Method of Reading the Foreign Service Examination in English Composition; ETS Research Bulletin, 1950(2); ETS RB-50-57; Dec. 1950.

Crossley, Scott, Mcnamara, Danielle; Text Coherence and Judgments of Essay Quality: Models of Quality and Coherence; Proceedings of the 29th Annual Conference of the Cognitive Science Society; pp. 1236-1241; 2011.

Elliot, Norbert, Klobucar, Andrew; Automated Essay Evaluation and the Teaching of Writing; Ch. 2 in Handbook for Automated Essay Scoring, M. Shermis & J. Burstein, Eds.; Routledge, New York, NY; pp. 16-35; 2013.

Elsner, Micha, Charniak, Eugene; Coreference-inspired Coherence Modeling; Proceedings of the 46th Annual Meeting of the Association for Computational Linguistics on Human Language Technologies: Short Papers; pp. 41-44; 2008.

Elsner, Micha, Austerweil, Joseph, Charniak, Eugene; A Unified Local and Global Model for Discourse Coherence; Proceedings of the North American Association for Computational Linguistics on Human Language Technologies; 2007.

Ercan, Gonenc, Cicekli, Ilyas; Using Lexical Chains for Keyword Extraction; Information Processing & Management, 43(6); pp. 1705-1714; Nov. 2007.

Feng, Lijun, Elhadad, Noemie, Huenerfauth, Matt; Cognitively Motivated Features for Readability Assessment; Proceedings of the 12th Conference of the European Chapter of the Association for Computational Linguistics; pp. 229-237; 2009.

Foltz, Peter, Kintsch, Walter, Landauer, Thomas; Textual Coherence Using Latent Semantic Analysis; Discourse Processes, 25(2&3); pp. 285-307; 1998.

Godshalk, Fred, Swineford, Frances, Coffman, William; The Measurement of Writing Ability; College Entrance Exam Board; New York, NY; 1966.

Graesser, Arthur, Mcnamara, Danielle, Kulikowich, Jonna; Coh-Metrix: Providing Multilevel Analyses of Text Characteristics; Educational Researcher, 40(5); pp. 223-234; 2011.

Graesser, Arthur, McNamara, Danielle, Louwerse, Max, Cai, Zhiqiang; Coh-Metrix: Analysis of Text on Cohesion and Language; Behavioral Research, Methods, Instruments and Computers, 36(2); pp. 193-202; 2004.

Grosz, Barbara, Joshi, Aravind, Weinstein, Scott; Centering: A Framework for Modelling the Local Coherence of Discourse; Computational Linguistics, 21(2); pp. 203-226; Jan. 1995.

Halliday, M.A.K., Hasan, Ruqaiya; Cohesion in English; Longman: London, UK; 1976.

Hatch, Paula, Stokes, Nicola, Carthy, Joseph; Topic Detection, a New Application for Lexical Chaining?; Proceedings of the BCS-IRSG; pp. 94-103; 2000.

Hearst, Marti; TextTiling: Segmenting Text Into Multi-Paragraph Subtopic Passages; Computational Linguistics, 23 (1); pp. 33-64; 1997.

Higgins, Derrick, Burstein, Jill, Marcu, Daniel, Gentile, Claudia; Evaluating Multiple Aspects of Coherence in Student Essays; Proceedings of the Annual Meeting of the Human Language Technology and North American Association for Computational Linguistics; pp. 185-192; May 2004.

Hirst, Graeme, St-Onge, David; Lexical Chains as Representations of Context for the Detection and Correction of Malapropisms; WordNet: An Electronic Lexical Database; MIT Press; pp. 305-332; 1998.

Hobbs, Jerry; Coherence and Coreference; Cognitive Science, 3(1); pp. 67-90; 1979.

(56) References Cited

OTHER PUBLICATIONS

Huddleston, Edith; Measurement of Writing Ability at the College-Entrance Level: Objective vs. Subjective Testing Techniques; ETS Research Bulletin; ETS RB-52-7; 1952.

Kanerva, Pentti, Kristoferson, Jan, Holst, Anders; Random Indexing of Text Samples for Latent Semantic Analysis; Proceedings of 22nd Annual Conference of the Cognitive Science Society; 2000.

Kwong, Oi Yee; Constructing an Annotated Story Corpus: Some Observations and Issues; Proceedings of the LREC; pp. 2062-2067; 2010.

Landis, J. Richard, Koch, Gary; The Measurement of Observer Agreement for Categorical Data; Biometrics, 33; pp. 159-174; Mar. 1977.

Lin, Dekang; Automatic Retrieval and Clustering of Similar Words; Proceedings of the 17th International Conference on Computational Linguistics, 2; pp. 768-774; 1998.

Lin, Ziheng, Ng, Hwee Tou, Kan, Min-Yen; Automatically Evaluating Text Coherence Using Discourse Relations; Proceedings of the 49th Annual Meeting of the Association for Computational Linguistics: Human Language Technologies, 1; pp. 997-1006; 2011.

Louis, Annie, Nenkova, Ani; A Corpus of Science Journalism for Analyzing Writing Quality; Dialogue and Discourse 4(2); pp. 87-117; 2013.

Mann, William, Thompson, Sandra; Rhetorical Structure Theory: Toward a Functional Theory of Text Organization; Text 8(3); pp. 243-281; 1988.

Marcu, Daniel; The Theory and Practice of Discourse Parsing and Summarization; MIT Press: Cambridge, MA; 2000.

Miltsakaki, Eleni, Kukich, Karen; Automated Evaluation of Coherence in Student Essays; Proceedings of LREC; 2000.

Moe, Alden; Cohesion, Coherence, and the Comprehension of Text; Journal of Reading, 23(1); pp. 16-20; Oct. 1979.

Moldovan, Dan, Novischi, Adrian; Lexical Chains for Question Answering; Proceedings of the 19th International Conference on Computational Linguistics, 1; pp. 1-7; 2002.

Morris, Jane, Hirst, Graeme; Lexical Cohesion Computed by Thesaural Relations as an Indicator of the Structure of Text; Computational Linguistics, 17(1); pp. 21-48; 1991.

Perfetti, Charles, Lesgold, Alan; Discourse Comprehension and Sources of Individual Differences; Cognitive Processing in Comprehension, M. Just & P. Carpenter (Eds.); Lawrence Erlbaum Associates: Hillsdale, NJ; 1977.

Pitler, Emily, Nenkova, Ani; Revisiting Readability: A Unified Framework for Predicting Text Quality; Proceedings of the Conference on Empirical Methods in Natural Language Processing; pp. 186-195; 2008.

Prasad, Rashmi, Dinesh, Nikhil, Lee, Alan, Miltsakaki, Eleni, Robaldo, Livio, Joshi, Aravind, Webber, Bonnie; The Penn Discourse TreeBank 2.0; Proceedings of the LREC; 2008.

Quinlan, J. Ross; C4.5: Programs for Machine Learning; Morgan Kaufmann Publishers: San Francisco, CA; 1993.

Rus, Vasile, Niraula, Nobal; Automated Detection of Local Coherence in Short Argumentative Essays Based on Centering Theory; Computational Linguistics and Intelligent Text Processing, 7181; pp. 450-461; 2012.

Sahlgren, Magnus; Vector-Based Semantic Analysis: Representing Word Meanings Based on Random Labels; ESSLI Workshop on Semantic Knowledge Acquisition and Categorization; 2001.

Schriver, Karen; Evaluating Text Quality: the Continuun from Text-Focused to Reader-Focused Methods; IEEE Transactions on Professional Communication, 32(4); pp. 238-255; 1989.

Schwarm, Sarah, Ostendorf, Mari; Reading Level Assessment Using Support Vector Machines and Statistical Language Models; Proceedings of the 43rd Annual Meeting of the Association for Computational Linguistics; pp. 523-530; Jun. 2005.

Sheehan, Kathleen, Kostin, Irene, Futagi, Yoko, Flor, Michael; Generating Automated Text Complexity Classifications That Are Aligned With Targeted Text Complexity Standards; ETS Research Report, RR-10-28; Dec. 2010.

Soricut, Radu, Marcu, Daniel; Discourse Generation Using Utility-Trained Coherence Models; Proceedings of the COLING/ACL; pp. 803-810; 2006.

Stokes, Nicola; Spoken and Written News Story Segmentation Using Lexical Chains; Proceedings of the HLT-NAACL Student Research Workshop; pp. 49-54; Jun. 2003.

Van Den Broek, Paul; Individual and Developmental Differences in Reading Comprehension: Assessing Cognitive Processes and Outcomes; Ch. 3 in Measuring Up: Advances in How We Assess Reading Ability, J. Sabatini et al. (Eds.); pp. 39-58; Lanham: Rowman & Littlefield Education; pp. 39-58; 2012.

Van Den Broek, Paul, Fletcher, Charles, Risden, Kirsten; Investigations of Inferential Processes in Reading: A Theoretical and Methodological Integration; Discourse Processes, 16(1-2); pp. 169-180; 1993.

Wang, Y., Harrington, M., White, P.; Detecting Breakdown in Local Coherence in the Writing of Chinese English Learners; Journal of Computer Assisted Learning, 28; pp. 396-410; 2012.

Witte, Stephen, Faigley, Lester; Coherence, Cohesion, and Writing Quality; College Composition and Communication, 32(2); pp. 189-204; May 1981.

Wolf, Florian, Gibson, Edward; Representing Discourse Coherence: A Corpus-Based Study; Computational Linguistics, 31(2); pp. 249-288; 2005.

\* cited by examiner themselves. In fact, technology frees humanity to not only tackle new problems, but may itself create new issues that did not exist without technology. For example, the proliferation of automobiles has introduced a need for fuel conservation on a global scale. With increasing energy demands from emerging markets, global warming becomes a concern inconceivable to the horse-and-buggy generation. Likewise dependence on oil has created nation-states that are not dependent on taxation, allowing ruling parties to oppress minority groups such as women. Solutions to these complex problems require the unfettered imaginations of maverick scientists and politicians. In contrast to the statement, we can even see how technology frees the human imagination. Consider how the digital revolution and the advent of the internet has allowed for the unprecedented exchange of ideas. WebMD, a popular internet portal for medical information, permits patients to self research symptoms for a more informed doctor visit.

Fig. 2

COMPUTER-IMPLEMENTED SYSTEMS AND METHODS FOR MEASURING DISCOURSE COHERENCE

CROSS-REFERENCE TO RELATED APPLICATIONS

This application claims priority to U.S. Provisional Patent Application No. 61/945,866, filed Feb. 28, 2014, entitled "Discourse Coherence Systems with Lexical Chaining," and U.S. Provisional Patent Application No. 61/949,499 filed Mar. 7, 2014, entitled "Discourse Coherence Systems with Lexical Chaining," both of which are incorporated herein by reference in their entirety.

FIELD

The technology described in this patent document relates generally to text response scoring and more particularly to automatically scoring coherence of a text using a computer-implemented scoring model.

BACKGROUND

The field of automated essay evaluation seeks to build systems that evaluate the overall quality of essays consistent with how a human would score those essays. An accurate, reliable automated evaluation engine can provide a large time and cost savings over manual human scoring alternatives. In developing automated scoring systems, developers seek to generate features that accurately approximate human impressions of essay quality. One such human impression is the coherence of a text being evaluated. A reader's ability to construct meaning from text, sometimes referred to as coherence, is greatly influenced by the presence and organization of cohesive elements in the text. Systems and methods as described herein provide a solution to the problem of measuring text coherence by providing mechanisms for extracting coherence-indicating metrics from a text under consideration.

SUMMARY

Systems and methods are provided for automatically generating a coherence score for a text using a scoring model. A lexical chain is identified within a text to be scored, where the lexical chain comprises a set of words spaced within the text. A discourse element is identified within the text, where the discourse element comprises a word within the text. A coherence metric is determined based on a relationship between the lexical chain and the discourse element. A coherence score is generated using a scoring model by providing the coherence metric to the scoring model.

As another example, a computer-implemented system for automatically generating a coherence score for a text using a scoring model includes a processing system and a non-transitory computer-readable medium encoded to contain instructions for commanding the execute steps of a method. In the method, a lexical chain is identified within a text to be scored, where the lexical chain comprises a set of words spaced within the text. A discourse element is identified within the text, where the discourse element comprises a word within the text. A coherence metric is determined based on a relationship between the lexical chain and the discourse element. A coherence score is generated using a scoring model by providing the coherence metric to the scoring model.

As a further example, a non-transitory computer-readable medium is encoded with instructions for commanding a processing system to execute a method of automatically generating a coherence score for a text using a scoring model. In the method, a lexical chain is identified within a text to be scored, where the lexical chain comprises a set of words spaced within the text. A discourse element is identified within the text, where the discourse element comprises a word within the text. A coherence metric is determined based on a relationship between the lexical chain and the discourse element. A coherence score is generated using a scoring model by providing the coherence metric to the scoring model.

BRIEF DESCRIPTION OF THE DRAWINGS

FIG. 2 is a diagram depicting an example text including annotations of lexical chains and discourse elements.

DETAILED DESCRIPTION

Figure 1:
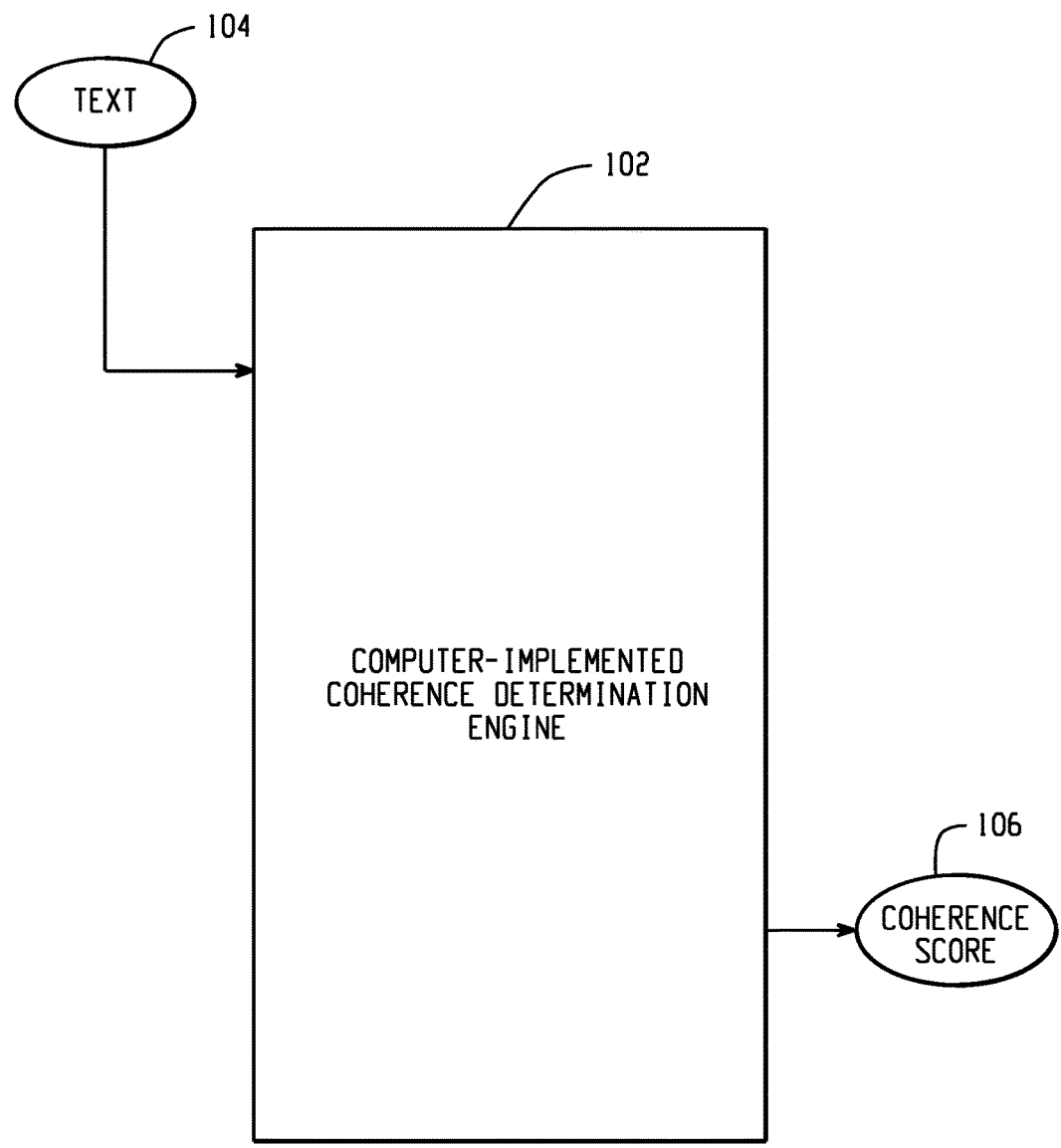
FIG. 1 is a block diagram depicting a computer implemented coherence determination engine.

FIG. 1 is a block diagram depicting a computer implemented coherence determination engine. A computer-implemented coherence determination engine 102 receives a text 104, such as a text response to an essay, and evaluates the text to generate a coherence score 106 for the text 104. In one embodiment of the disclosure, the coherence determination engine 102 analyzes lexical chains within the text to evaluate discourse coherence. The engine 102 utilizes attributes of lexical chains to measure coherence quality in the text 104, such as adherence to a text topic, elaboration, usage of varied vocabulary, and sound organization of thoughts and ideas. The engine 102 identifies lexical chains within the text 104 and extracts linguistically-motivated features from them. Features such as chain length, density, and link strength can reveal discourse qualities, such as focus and elaboration. In addition, interactions between identified lexical chains and discourse elements (cues) identified in the text 104 can reveal whether the cohesive elements in a text have been organized in a coherent fashion.

The computer-implemented coherence determination engine 102 is tasked with identifying lexical chains running through the text. A lexical chain is a set of related words within a text that contribute to the continuity of lexical meaning A lexical chain can be indicative of themes or thoughts as they run through a text 104. A lexical chain is identified based upon an amount of relatedness of words within a text and their distance. Words of the lexical chain may be spaced apart, that is, some of the words of the chain may be non-adjacent. The coherence determination engine starts with a first candidate word and evaluates other candidate words in the text 104 (e.g., sequentially) to determine whether the other candidate words should be added to a current lexical chain. Candidate words can be nouns in one example or include other parts of speech in other examples. In one embodiment, a lexical chain score is determined for a next candidate word based on a relatedness of that next candidate word to the first candidate word and a distance (e.g., number of words, number of sentences) in the text between the first candidate word and the next candidate word in the text 104. The amount of relatedness of two words can be ascertained from a computerized statistical model that identifies degrees of relatedness among various words, e.g., that identifies synonyms and optionally numerical degrees of similarity among such words. In another example, word relatedness can be determined via reference to a computer-readable data store containing word relatedness data, such as a thesaurus data store. Identical words have the highest degree of relatedness, with non-identical words varying in their level of relatedness. When that lexical chain score is greater than a threshold value, the next candidate word is added to the chain (e.g., include candidate words with strong relationships within six sentences; include candidate words with medium-strong relationships within three sentences). In one example, words identical to the first candidate word are included in the lexical chain regardless of the position of their appearance in the text 104, while words having less-strong relatedness may be added to the chain based upon their distance from the first candidate word.

A number of features can be extracted from lexical chains identified in the text 104. Example features include a total number of chains, a total number of chains normalized for text 104 length, average size of chains, a length of longest chain, a number of chains at least a threshold size, as well of others. Further features can be extracted based upon the identified lexical chains and other features of the text.

In one example, the coherence determination engine 102 is configured to examine relationships between identified lexical chains and discourse elements within the text 104 according to a computerized coherence scoring model. Discourse elements identify organization within a text. For example, an argument initiation discourse element [arg_int] (e.g., "first," "second") indicates a start of a thought, while an argument development discourse element [arg_dev] indicates a continuation of a thought. The coherence determination engine identifies discourse elements in the text 104 (e.g., by storing position identifiers in a database, by replacing an identified discourse element with a discourse element tag). Discourse elements, in one example, are identified using a reference such as a data store or database that contains a list of discourse elements (e.g., concept transition words such as first, second, third, last, then, however, in contrast, but, and concept continuation words such as therefore, in fact, likewise, for example) and associated discourse element types (e.g., via lookup operations with a computer database contain a list of discourse elements).

The computerized coherence scoring model includes various features (variables) that may be combined according to associated feature weights. For example, the computerized coherence scoring model may be a linear regression model for which a coherence score is determined from a linear combination of weighted features. The values of the feature weights may be determined by training the computerized scoring model using a training corpus of texts that have already been assigned coherence scores, e.g., by human scorers. Features for use in the scoring model can be extracted based on relationships between identified lexical chains and identified discourse elements. In one embodiment, a coherence determination engine determines features for each discourse element, such as a number of lexical chains that end before that discourse element, the number of lexical chains that start after that discourse element, and the number of lexical chains that start before the discourse element and end after (span) the discourse element. Such features, alone or in combination, can be indicative of discourse coherence in the text 104. For example, an argument initiation discourse element might indicate a change in topic, where a text with high coherence would have limited lexical chains that start before and end after. An argument development discourse element might indicate a continuation of a topic. There, a larger number of lexical chains that start before and end after would be expected in coherent text. A model training operation, as noted above and described further herein, identifies correlations between human coherence scores and extracted features to identify the contribution of different features to a scoring model (e.g., feature weights).

FIG. 2 is a diagram depicting an example text including annotations of lexical chains and discourse elements. In FIG. 2, discourse elements are indicated as circled words. A first discourse element, "In fact," at 202 is a development discourse element, while a second discourse element, "but," at 204 is indicative of a potential change in thought. Other idea development discourse elements include "For example" in line 2 and "likewise" in line 4. "In contrast" at line 7 is indicative of a potential change in topic. A number of lexical chains are also identified in the text. A first chain includes the word "technology" in lines 1, 2, and 7, "information" in line 9, and "research" in line 9. While there are a number of words between "technology" in lines 2 and 7, the use of identical words weights toward continuation of the lexical chain. A second lexical chain includes the word "need" in line 2 and "concern" in line 4. A third lexical chain includes the word "fuel" in line 2, "energy" in line 3, and "oil" in line 4.

The computer-implemented coherence determination engine extracts features from identified discourse elements and lexical chains. For example, for the "For example" discourse element in line 2, the engine would track that the "technology" lexical chain spans (i.e., begins before and ends after) the discourse element and would count the "fuel" lexical chain in a count of lexical chains that begin after the discourse element. For the "likewise" discourse element in line 4, the engine would count the "technology" and "fuel" lexical chains as lexical chains that span the discourse element.

Figure 3:
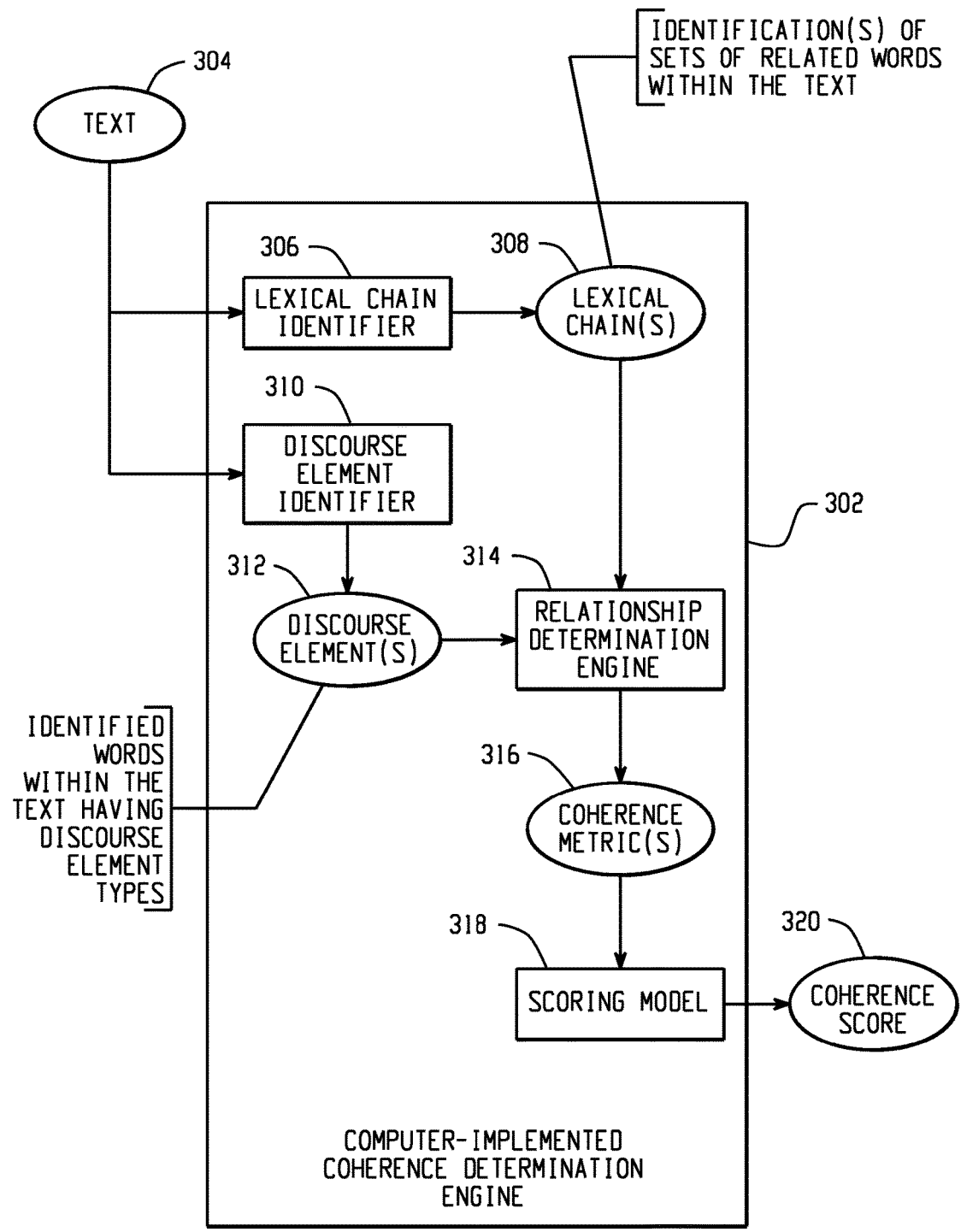
FIG. 3 is a block diagram depicting an example computer-implemented coherence determination engine.

FIG. 3 is a block diagram depicting an example computer-implemented coherence determination engine. The coherence determination engine 302 receives a text 304, such as an examinee response to an essay prompt or a transcript of examinee speech, for scoring. A lexical chain identifier 306 identifies one or more lexical chains 308 within the text 304 that comprise sets of related words within the text 304. In one example, the lexical chain identifier 306 is configured to reference a thesaurus, which identifies relatedness of words, and distances between words in the text 304 to determine lexical chain membership. A discourse element identifier 310 identifies one or more discourse elements 312 within the text 304, such as via reference to a discourse element repository that identifies discourse elements and types. A relationship determination engine 314 extracts features from the lexical chains 308, the discourse elements 312, and their relationships to generate coherence metrics 316. A coherence metric 316 may be based on a single feature (e.g., a number of lexical chains that span a discourse element of [arg_init] type) or a combination of a number of features. A computerized scoring model 318 transforms one or more received coherence metrics, alone or in combination with other metrics (e.g., grammar error metrics, rhetorical relation metrics, type/token metrics) into a coherence score 320 indicating a level of discourse coherence of the text 304.

Figure 4:
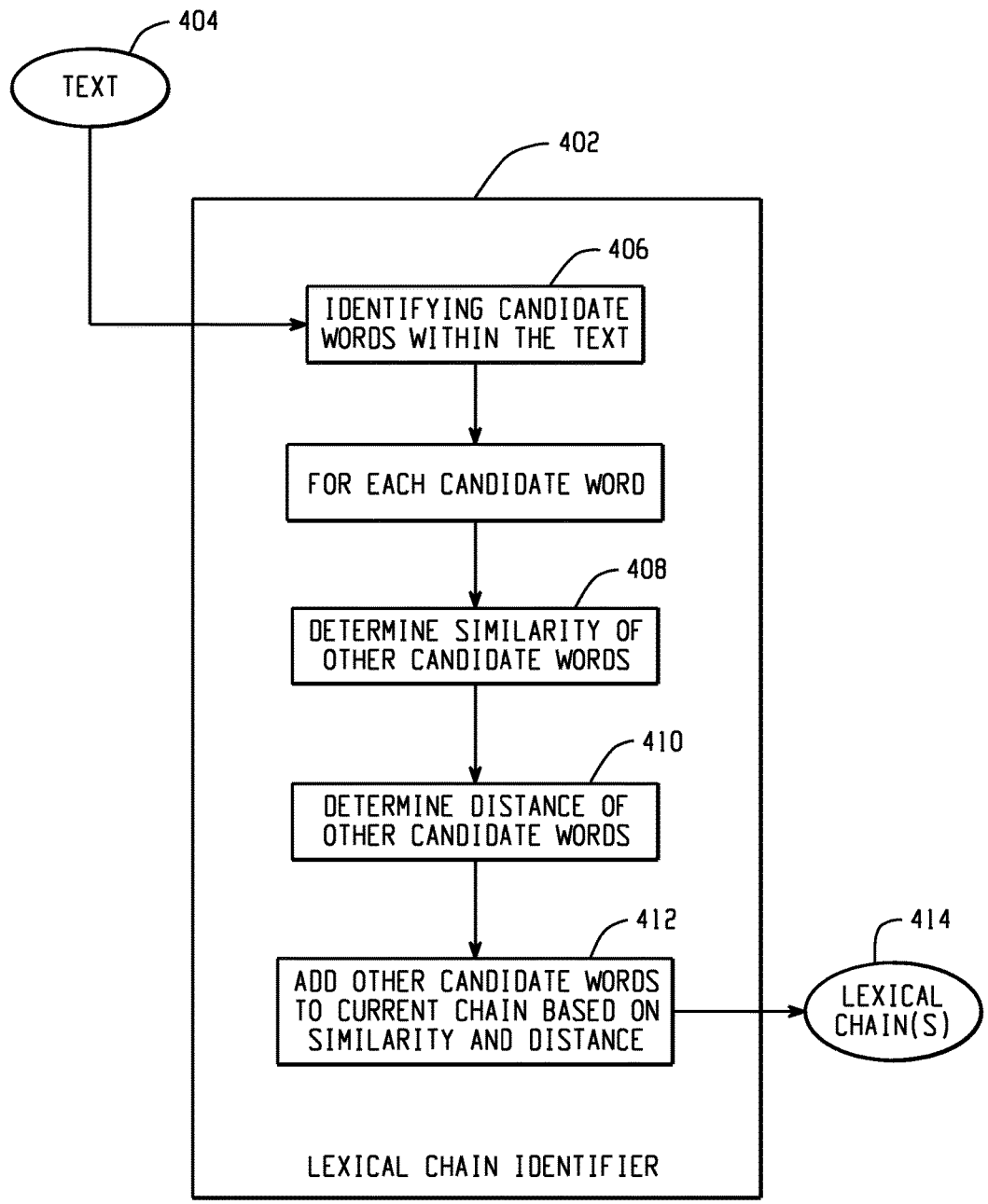
FIG. 4 is a diagram depicting example operations performed by a computer-implemented lexical chain identifier.

FIG. 4 is a diagram depicting example operations performed by a computer-implemented lexical chain identifier. A lexical chain identifier 402 receives a text 404 and identifies candidate words within the text at 406, such as based on parts of speech of those candidate words. For each candidate word, the lexical chain identifier 402 determines a similarity of other candidate words (e.g., on a scale of 0-1, with identical words scoring 1.0, synonyms scoring above 0.5, and unrelated words scoring near 0.0) in the text 404 at 408. At 410, the lexical chain identifier 410 determines a distance (e.g., number of words) between other candidate words and the candidate word currently being considered. At 412, a determination is made as to whether to add one of the other candidate words to the current lexical chain based on the similarity values for the other candidate words determined at 408 and the distances determined at 410. In one example, an "other" candidate word is added to a current lexical chain when its distance multiplied by (1—similarity score) is less than a threshold value. In another example, multiple distance threshold are used, such as where identical words are added to the current lexical chain regardless of location, closely related words within n sentences are added, and moderately related words within 3 sentences are added. In one embodiment, where an other candidate word is added to a lexical chain, the evaluation continues at 408 based on that added candidate word. When no other candidate words are added to a lexical chain in a pass at 408, 410, 412, a lexical chain is output at 414.

Figure 5:
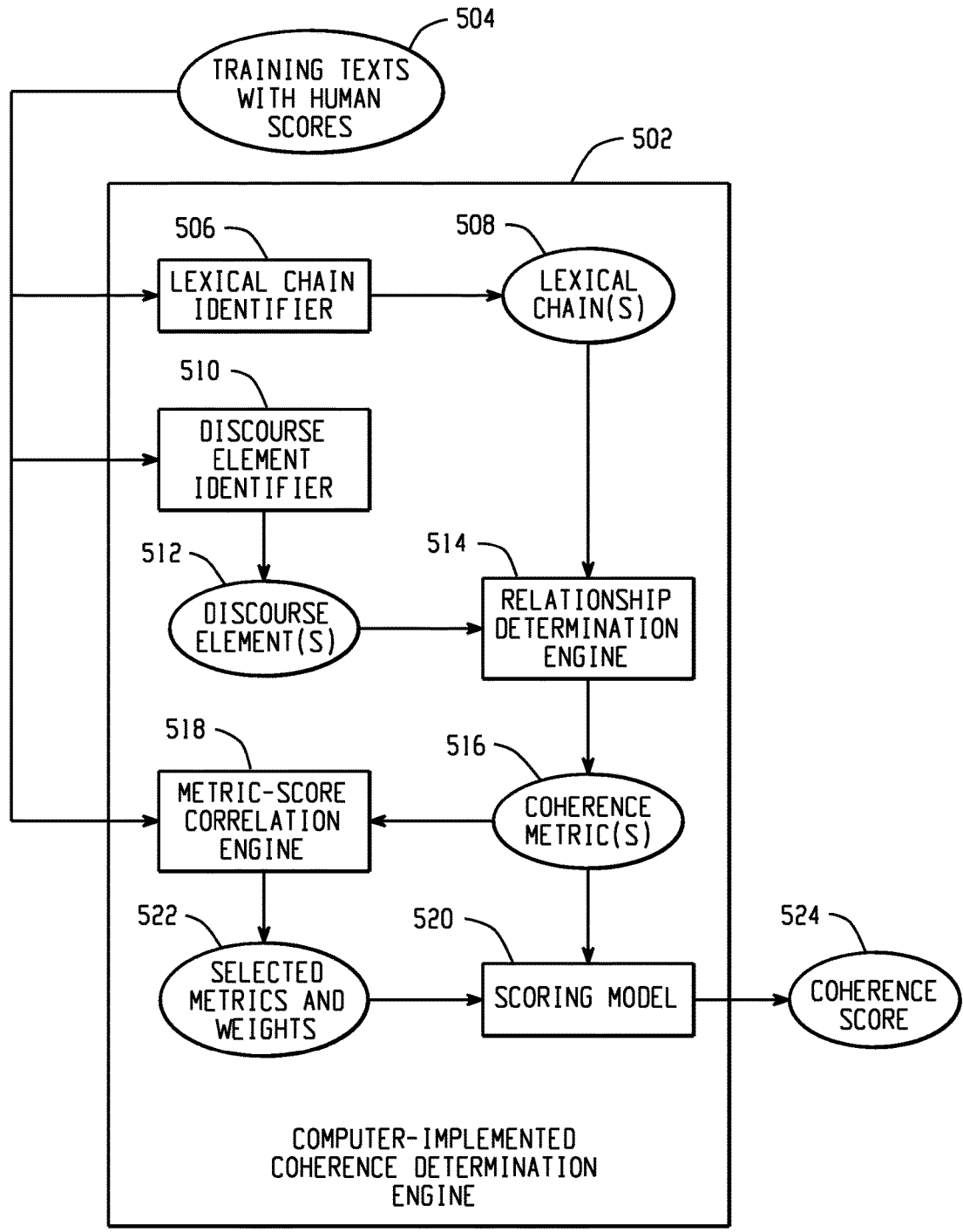
FIG. 5 is a diagram depicting an example computer-implemented coherence determination engine that includes a model training mode.

FIG. 5 is a diagram depicting an example computer-implemented coherence determination engine that includes a model training mode. A computer-implemented coherence determination engine 502 functions similar to the example of FIG. 3 in an operational mode. In a training mode, the engine 502 seeks to select coherence metrics, other metrics, and weights that provide an approximation of human scoring that are of sufficient quality. To train the system, the engine 502 receives a set of training texts at 504 that include human provided coherence scores. A lexical chain identifier 506 operates as described above to identify one or more lexical chains 508 within the texts 504. A discourse element identifier 510 also functions similarly as described above to identify discourse elements 512 within the texts 504.

In training mode, the relationship determination engine 514 determines one or more coherence metrics 516 based on relationships between the identified lexical chains 508 and discourse elements 512. In a training mode, the relationship determination engine 514 may determine a large number of coherence metrics to facilitate a determination by a metric-score correlation engine 518 of which coherence metrics 516 are helpful in approximating a human provided coherence score. (In an operational mode, the relationship determination engine 514 may only calculate coherence metrics 516 that will be actually used by a scoring model 520.) The determined coherence metrics 516 for the training texts 504 and the associated human scores are provided to the metric-score correlation engine 518. The correlation engine 518 uses statistical techniques to determine which coherence metrics 516 or combinations of coherence metrics 516 are suited for automatically generating coherence scores that approximate human scores. The metric-score correlation engine 518 identifies selected metrics and weights for those metrics at 522 that are provided to a scoring model 520. The configured scoring model 520 can then be utilized in an operational mode to automatically generate coherence scores 524.

In one embodiment, training texts are provided that are similar to a type of texts to be scored. For example, texts by similar populations (e.g., native speakers, non-native speakers) may be provided to the engine 502. In another example, genres of texts (e.g., informational texts, fiction texts, persuasive essays) are provided to the engine 502 for training based on an expected type of texts to be scored (e.g., according to a response type expected from an essay prompt).

Figure 6:
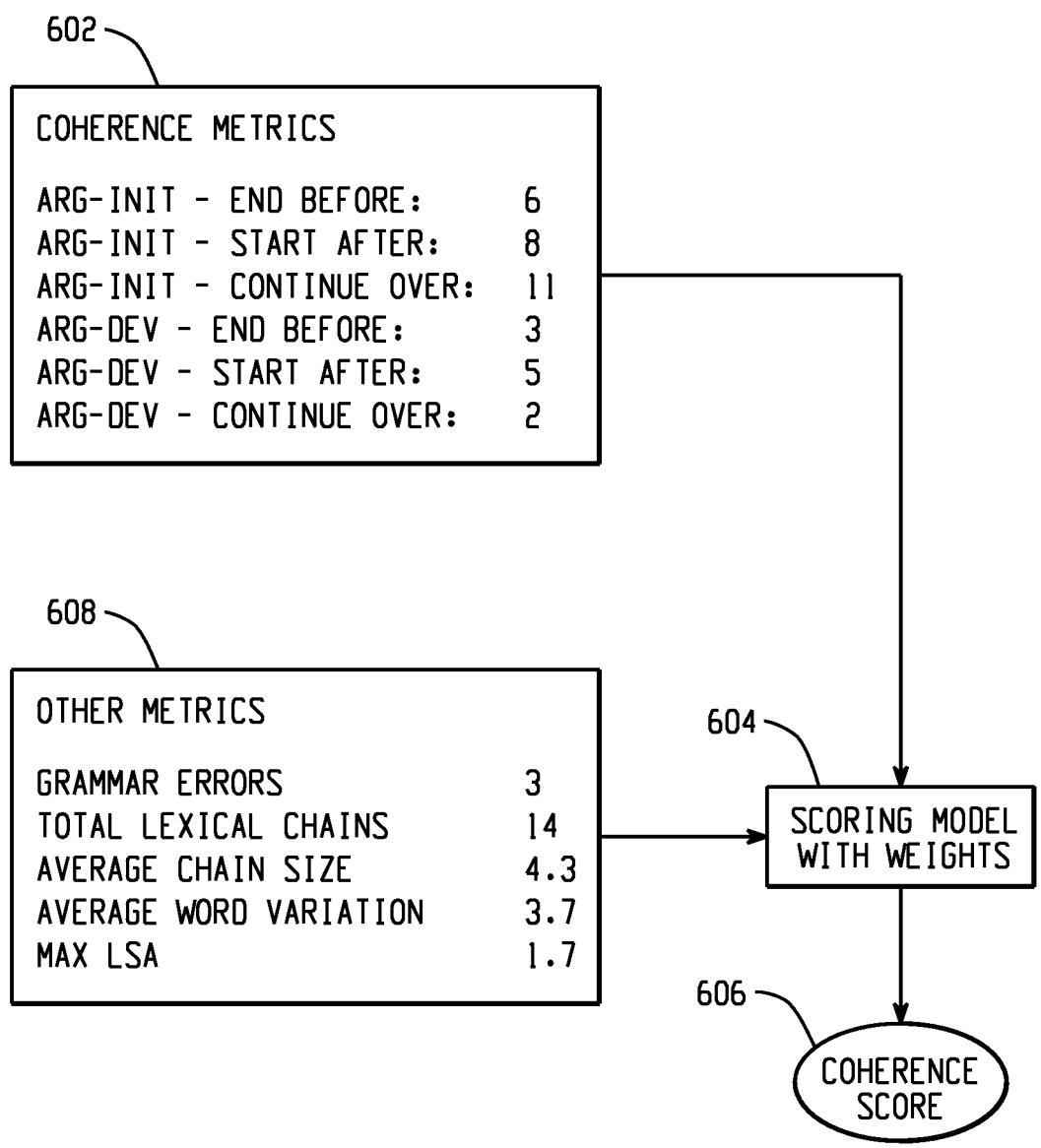
FIG. 6 is a diagram depicting example selected metrics and associated weights determined by a metric-score correlation engine and provided to a scoring model.

FIG. 6 is a diagram depicting example selected metrics and associated weights determined by a metric-score correlation engine and provided to a computerized coherence scoring model. The example of FIG. 6 identifies six coherence metrics that are based on relationships between lexical chains and discourse elements and associated weights at 602 that will be transformed by a scoring model 604 into coherence scores 606 for essays. At 608, a set of five other metrics that are based on lexical chains and non-lexical chain features (e.g., grammar error metrics, maximum latent semantic analysis metrics) is depicted that will be considered by the scoring model 604 in generating the coherence score 606. In one example, the scoring model 604 generates the coherence score 606 as a weighted sum of the 11 identified metric values based on their indicated weights. As noted above, the computerized coherence scoring model may be a linear regression model, for example, whose feature weights are determined via training as noted above.

Figure 7:
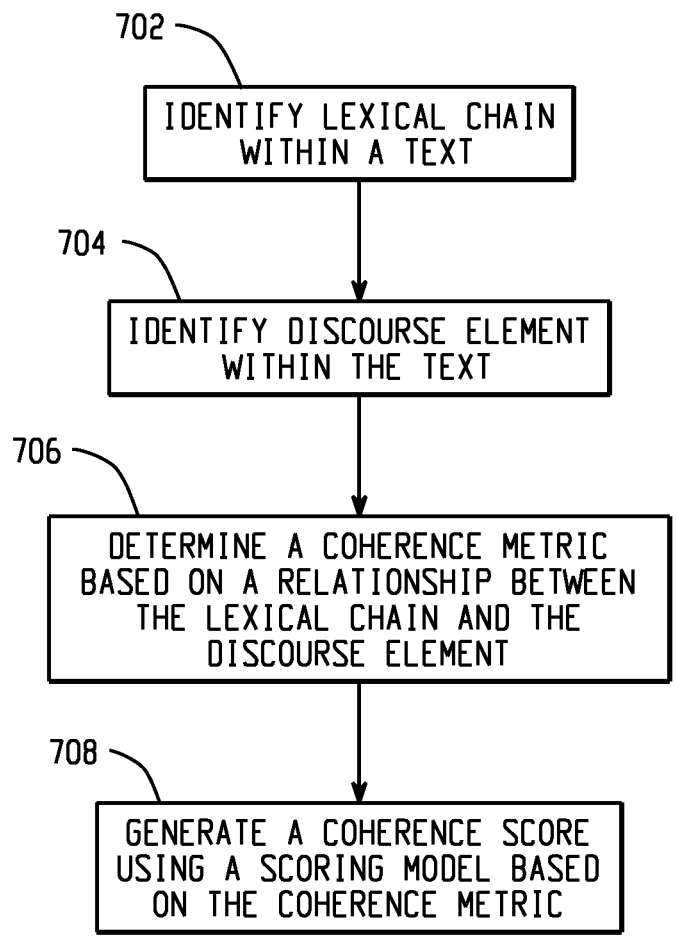
FIG. 7 is a flow diagram depicting a computer-implemented method of automatically generating a coherence score for a text using a scoring model.

FIG. 7 is a flow diagram depicting a computer-implemented method of automatically generating a coherence score for a text using a computerized coherence scoring model. At 702, a lexical chain is identified within a text to be scored, where the lexical chain comprises a set of words spaced within the text. At 704, a discourse element is identified within the text, where the discourse element comprises a word within the text. At 706, coherence metric is determined based on a relationship between the lexical chain and the discourse element. A coherence score is generated at 708 using a scoring model by providing the coherence metric to the scoring model. These steps can be repeated for various other discourse elements within the text, and the individual scores from those multiple applications can be combined (e.g., summed, averaged, or otherwise combined) so as to provide an overall coherence score for the text as a whole.

The computerized approaches for scoring lexical coherence described herein, which utilize, e.g., various computer models trained according to sample data, are very different from conventional human scoring of coherence in writing. In conventional human scoring of writing coherence, a human grader reads a text and makes a holistic, mental judgment about its coherence and assigns a score. Conventional human grading of text coherence does not involve the use of the computer models, associated variables, training of the models based on sample data to calculate weights of various features or variables, computer processing to parse the text to be scored and representing such parsed text with suitable data structures, and applying the computer models to those data structures to score the coherence of the text, as described herein.

Figure 8A:
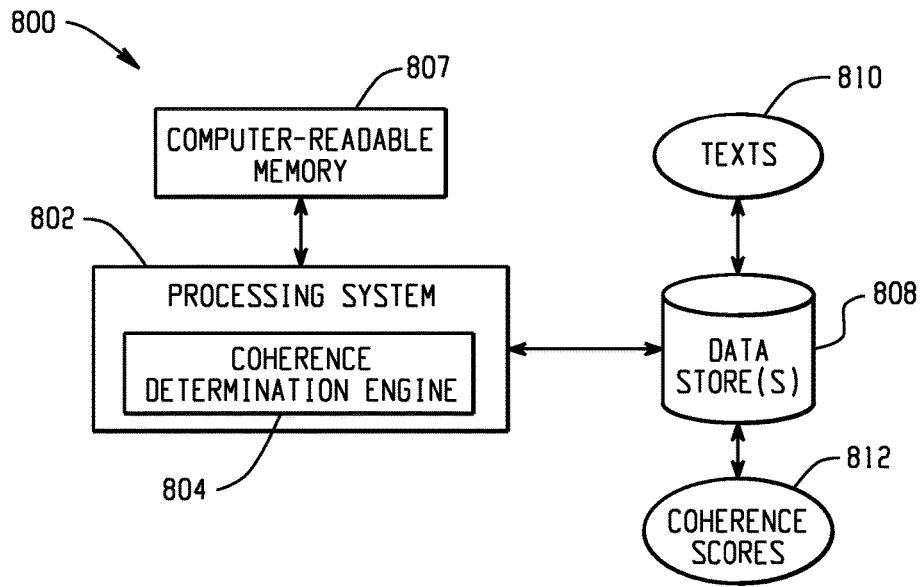
FIGS. 8A, 8B, and 8C depict example systems for implementing the approaches described herein for generating a coherence score for a text.
Figure 8B:
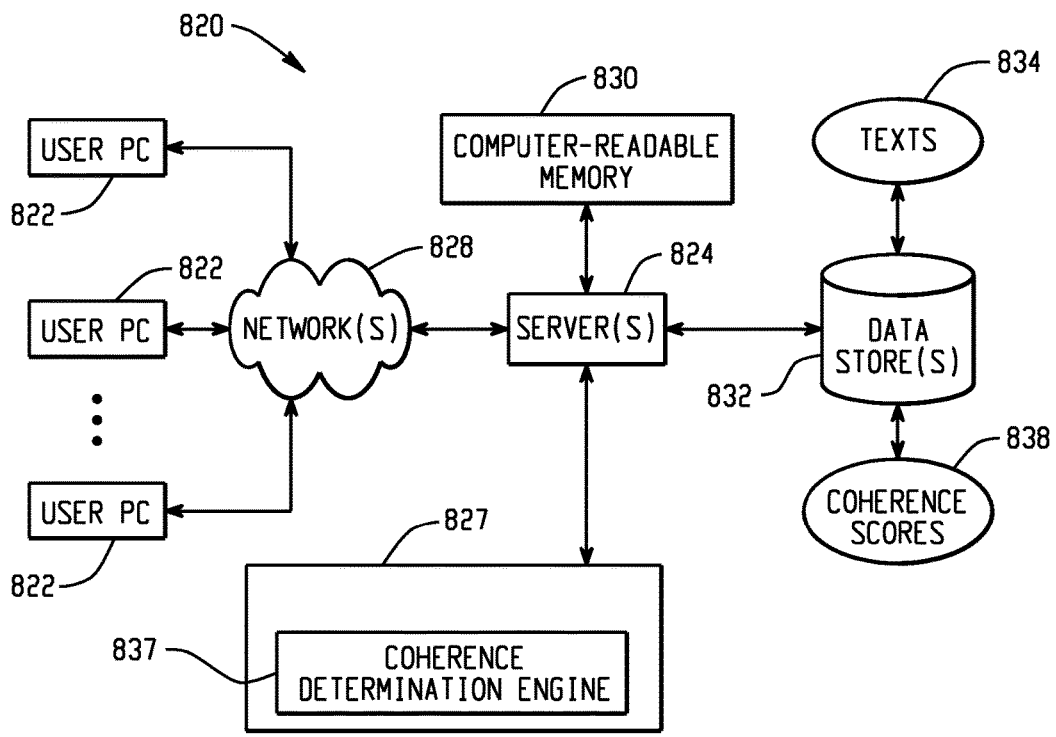
Figure 8C:
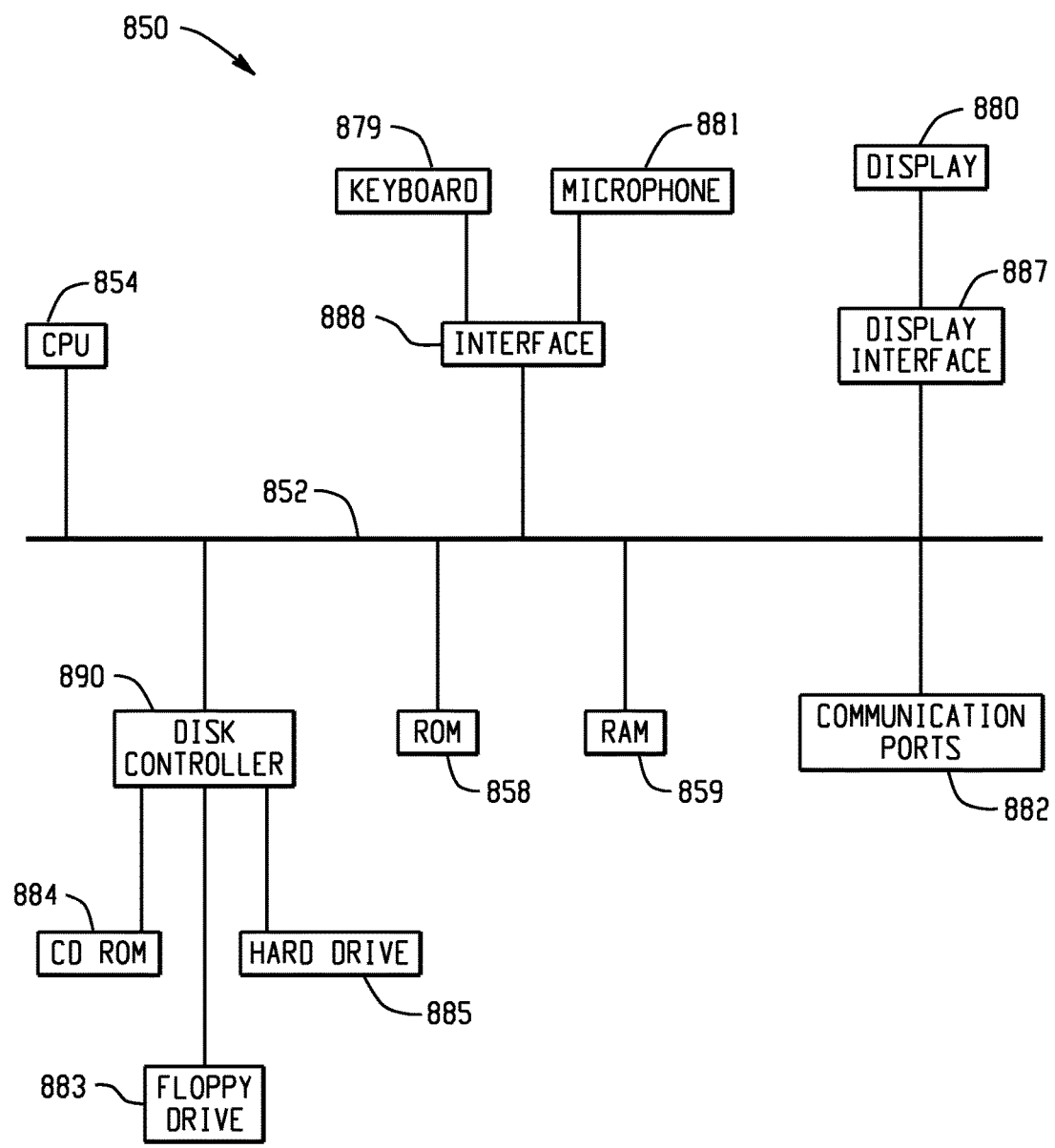

FIGS. 8A, 8B, and 8C depict example systems for implementing the approaches described herein for generating a coherence score for a text. For example, FIG. 8A depicts an exemplary system 800 that includes a standalone computer architecture where a processing system 802 (e.g., one or more computer processors located in a given computer or in multiple computers that may be separate and distinct from one another) includes a coherence determination engine 804 being executed on the processing system 802. The processing system 802 has access to a computer-readable memory 807 in addition to one or more data stores 808. The one or more data stores 808 may include input texts 810 as well as coherence scores 812. The processing system 802 may be a distributed parallel computing environment, which may be used to handle very large-scale data sets.

FIG. 8B depicts a system 820 that includes a client-server architecture. One or more user PCs 822 access one or more servers 824 running a coherence determination engine 837 on a processing system 827 via one or more networks 828. The one or more servers 824 may access a computer-readable memory 830 as well as one or more data stores 832. The one or more data stores 832 may include input texts 834 as well as coherence scores 838.

FIG. 8C shows a block diagram of exemplary hardware for a standalone computer architecture 850, such as the architecture depicted in FIG. 8A that may be used to include and/or implement the program instructions of system embodiments of the present disclosure. A bus 852 may serve as the information highway interconnecting the other illustrated components of the hardware. A processing system 854 labeled CPU (central processing unit) (e.g., one or more computer processors at a given computer or at multiple computers), may perform calculations and logic operations required to execute a program. A non-transitory processor-readable storage medium, such as read only memory (ROM) 858 and random access memory (RAM) 859, may be in communication with the processing system 854 and may include one or more programming instructions for performing the method of generating a coherence score for a text. Optionally, program instructions may be stored on a non-transitory computer-readable storage medium such as a magnetic disk, optical disk, recordable memory device, flash memory, or other physical storage medium.

In FIGS. 8A, 8B, and 8C, computer readable memories 808, 830, 858, 859 or data stores 808, 832, 883, 884, 888 may include one or more data structures for storing and associating various data used in the example systems for generating a coherence score for a text. For example, a data structure stored in any of the aforementioned locations may be used to store data from XML files, initial parameters, and/or data for other variables described herein. A disk controller 890 interfaces one or more optional disk drives to the system bus 852. These disk drives may be external or internal floppy disk drives such as 883, external or internal CD-ROM, CD-R, CD-RW or DVD drives such as 884, or external or internal hard drives 885. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 890, the ROM 858 and/or the RAM 859. The processor 854 may access one or more components as required.

A display interface 887 may permit information from the bus 852 to be displayed on a display 880 in audio, graphic, or alphanumeric format. Communication with external devices may optionally occur using various communication ports 882.

In addition to these computer-type components, the hardware may also include data input devices, such as a keyboard 879, or other input device 881, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A computer-implemented method of automatically generating a coherence score for a text using a scoring model, comprising:
    identifying a plurality of lexical chains within a text to be scored with a processing system, wherein a lexical chain comprises a set of words spaced within the text, certain words in the lexical chain being non-contiguous;

identifying a discourse element within the text with the processing system based on lookup operations with a computer database of discourse elements, wherein the discourse element comprises a word within the text;

determining a coherence metric with the processing system based on a relationship between the lexical chains and the discourse element; wherein determining the coherence metric comprises determining:
- a first count of lexical chains that end before the discourse element;
- a second count of lexical chains that begin after the discourse element; and
- a third count of lexical chains that begin before and end after the discourse element;
- wherein the coherence metric is determined based on the first count, the second count, and the third count;

generating a coherence score using the processing system by applying a scoring model to the coherence metric, wherein the scoring model comprises multiple weighted features whose feature weights are determined by training the scoring model relative to a plurality of training texts, the coherence score being combined with other non-lexical chain features by an automated essay evaluation engine to determine a transmitted quality level of the text.

2. The method of claim 1, wherein a discourse element type is associated with the discourse element, wherein the coherence metric is determined based on the discourse element type.

3. The method of claim 1, wherein the discourse element type identifies an expected transition within the text or identifies an expected topic continuation within the text.

4. The method of claim 1, wherein a plurality of discourse elements are identified within the text, wherein one or more coherence metrics are determined for each of the plurality of discourse elements.

5. The method of claim 1, wherein the discourse element identifies a transition within the text.

6. The method of claim 5, wherein the discourse element is a form of one of: first, second, third, next, last, then, however, in contrast, but.

7. The method of claim 1, wherein the discourse element identifies a continuation of a topic within the text.

8. The method of claim 7, wherein the discourse element is a form of one of: therefore, in fact, likewise, for example.

9. The method of claim 1, wherein the lexical chain comprises a set of related words spaced within the text.

10. The method of claim 9, wherein identifying the lexical chain comprises:
- identifying a first word of the lexical chain within the text;
- identifying a plurality of candidate words within the text;
- determining a level of relatedness between a candidate and the first word;
- adding the candidate word to the lexical chain based on the level of relatedness.

11. The method of claim 10, wherein identifying the lexical chain further comprises:
- determining a distance of the candidate word to a nearest word belonging to a lexical chain in the text, wherein the candidate word is added to the lexical chain based on the level of relatedness and the distance from a nearest word already belonging to the lexical chain.

12. The method of claim 1, comprising training the scoring model using a plurality of training texts, wherein each training text is associated with a human assigned coherence score.

13. The method of claim 12, wherein the text is associated with a particular genre, wherein the plurality of training texts are associated with the particular genre.

14. The method of claim 12, wherein the text is provided by a member of a particular population of people, wherein the plurality of training texts are provided by members of the particular population.

15. The method of claim 1, wherein generating the coherence score using the scoring model comprises assigning a weight to the coherence metric.

16. The method of claim 1, wherein the text is generated using an automated speech recognizer.

17. A computer-implemented system for automatically generating a coherence score for a text using a scoring model, comprising:
- one or more data processors;
- a non-transitory computer-readable medium encoded with instructions for commanding the one or more data processors to execute steps comprising:
  - identifying a plurality of lexical chains within a text to be scored, with a processing system, wherein a lexical chain comprises a set of words spaced within the text, certain words in the lexical chain being non-contiguous;
  - identifying a discourse element within the text, with the processing system based on lookup operations with a computer database of discourse elements wherein the discourse element comprises a word within the text;
  - determining a coherence metric with the processing system based on a relationship between the lexical chains and the discourse element, wherein determining the coherence metric comprises determining:
    - a first count of lexical chains that end before the discourse element;
    - a second count of lexical chains that begin after the discourse element; and
    - a third count of lexical chains that begin before and end after the discourse element;
    - wherein the coherence metric is determined based on the first count, the second count, and the third count;
  - generating a coherence score using the processing system by applying a scoring model to the coherence metric, wherein the scoring model comprises multiple weighted features whose feature weights are determined by training the scoring model relative to a plurality of training texts, the coherence score being combined with other non-lexical chain features by an automated essay evaluation engine to determine a transmitted quality level of the text.

18. The system of claim 17, wherein a discourse element type is associated with the discourse element, wherein the coherence metric is determined based on the discourse element type.

19. The system of claim 17, wherein the discourse element type identifies an expected transition within the text or identifies an expected topic continuation within the text.

20. The system of claim 17, wherein a plurality of discourse elements are identified within the text, wherein one or more coherence metrics are determined for each of the plurality of discourse elements.

21. The system of claim 17, wherein the discourse element identifies a transition within the text.

22. The system of claim 17, wherein the discourse element identifies a continuation of a topic within the text.

23. The system of claim 17, wherein the lexical chain comprises a set of related words spaced within the text.

24. The method of claim 23, wherein identifying the lexical chain comprises:
   identifying a first word of the lexical chain within the text;
   identifying a plurality of candidate words within the text;
   determining a level of relatedness between a candidate and the first word;
   adding the candidate word to the lexical chain based on the level of relatedness.

25. A non-transitory computer-readable medium encoded with instructions for automatically generating a coherence score for a text using a scoring model, the instructions when executed causing a computer processing system to execute steps comprising:
   identifying a plurality of lexical chains within a text to be scored, with a processing system, wherein a lexical chain comprises a set of words spaced within the text; certain words in the lexical chain being non-contiguous;
   identifying a discourse element within the text, with the processing system based on lookup operations with a computer database of discourse elements, wherein the discourse element comprises a word within the text;
   determining a coherence metric with the processing system based on a relationship between the lexical chains and the discourse element, wherein determining the coherence metric comprises determining:
      a first count of lexical chains that end before the discourse element;
      a second count of lexical chains that begin after the discourse element; and
      a third count of lexical chains that begin before and end after the discourse element;
      wherein the coherence metric is determined based on the first count, the second count and the third count;
   generating a coherence score using the processing system by applying a scoring model to the coherence metric, wherein the scoring model comprises multiple weighted features whose features weights are determined by training the scoring model relative to a plurality of training texts, the coherence score being combined with other non-lexical chain features by an automated essay evaluation engine to determine a transmitted quality level of the text.

* * * * *